United States Patent [19]

Imai et al.

[11] Patent Number: 4,924,253

[45] Date of Patent: May 8, 1990

[54] DRIVE APPARATUS FOR A FOCUSING LENS

[75] Inventors: Yuji Imai, Higashiyamato; Kazuyuki Iwasa, Mitaka, both of Japan

[73] Assignee: Olympus Optical Company Limited, Tokyo, Japan

[21] Appl. No.: 181,308

[22] Filed: Apr. 13, 1988

[30] Foreign Application Priority Data

Apr. 13, 1987 [JP] Japan .................................. 62-91533

[51] Int. Cl.[5] .......................... G03B 3/00; G03B 29/00
[52] U.S. Cl. .................................. 354/400; 354/402; 354/75; 354/80; 354/81
[58] Field of Search ............... 354/400, 402, 292, 75, 354/76, 80, 81, 412, 293, 288 R, 288 A, 288 B, 195.1, 195.12; 73/5; 356/124, 124.5, 125, 126; 350/429, 430, 255

[56] References Cited

U.S. PATENT DOCUMENTS

| | | | |
|---|---|---|---|
| 3,046,555 | 7/1962 | Richard et al. | 73/5 |
| 4,123,768 | 10/1978 | Kilshaw et al. | 354/80 X |
| 4,423,934 | 1/1984 | Lambeth et al. | 354/412 |
| 4,457,603 | 7/1984 | Gebhart et al. | 354/80 |
| 4,616,912 | 10/1986 | Johnsen | 354/80 |
| 4,692,005 | 9/1987 | Takami | 354/289.1 X |
| 4,737,814 | 4/1988 | Nakajima | 354/412 |
| 4,751,538 | 6/1988 | Konno | 354/288 X |

FOREIGN PATENT DOCUMENTS 2244076 3/1974 Fed. Rep. of Germany ........ 354/75

*Primary Examiner*—W. B. Perkey
*Attorney, Agent, or Firm*—Louis Weinstein

[57] ABSTRACT

A focusing lens drive apparatus in which an adjusting value for adjusting an fc error in an EEPROM of a digital memory has been stored, determines an amount of driving a focusing lens, when a CPU receives a measured range data from an AFIC, by calculation based on the measured range data and the adjusting value stored in the digital memory and drives the focusing lens by controlling a lens drive mechanism in accordance with the determined amount of driving the focusing lens. In addition, in a camera with a zoom lens and a camera of the two focus switching type, a plurality of adjusting values are stored in the digital memory in response to information of focal length.

Furthermore, such adjusting values are stored in the digital memory to adjust an fc error as well as an AF error in a range finder.

18 Claims, 18 Drawing Sheets

DRIVE APPARATUS FOR A FOCUSING LENS

FIELD OF THE INVENTION AND RELATED ART STATEMENT

The present invention relates to a drive apparatus for a focusing lens, and more particularly, to a drive apparatus for a focusing lens for use in still cameras, video cameras, microscopes, or the like.

There is well known an apparatus including a range finder for measuring a range to an object to be photographed which apparatus determines an amount for driving a focusing lens on the basis of data from the range finder and drives the focusing lens in accordance with the driving amount to focus it. While there is not a well-known lens drive apparatus in a fully automatic camera with a built-in zoom lens at present, the present applicant has disclosed such lens drive apparatus (Japanese patent application Sho61-279242).

In conventional lens drive apparatus, however, there occurs variation in a focused position due to variations in the power of a focusing lens or dimensions or assembling of mechanical parts such as a lens barrel. Such variation in a focused position is called an fc error. When an fc error exists, a focusing lens can not be precisely positioned at a focus point to cause an out of focus state. Accordingly, a process of mechanically adjusting an fc error, that is, an fc adjustment is essential in the past. Since the fc adjustment is manually effected, it requires much labor and increases the cost of products. In addition, it is required to previously add a mechanism for an fc adjustment to a product, so that a cost and a space are largely influenced.

In a fully automatic camera with a built-in zoom lens or of the two focal point switching type, there is a shift of a focal point which may be caused by switching focal lengths in addition to an fc error.

The shift of a focal point also varies with products like an fc error. A method for adjusting an fc error is very complicated. By way of example, there is provided a mechanism for independently adjusting an fc error at a plurality of focal lengths and, during the adjustment, an fc error at a first focal length is first adjusted and subsequently an fc error at a second focal length is again adjusted.

Thus, the method and mechanism for the adjustment are very complicated. In addition, while an fc error can precisely be adjusted at a focal length being adjusted, a certain degree of an fc error remains in an intermediate position, so that an fc error can not be completely eliminated.

SUMMARY OF THE INVENTION

It is an object of the present invention to provide a focusing lens drive apparatus which dispenses with a mechanical fc adjusting mechanism and automates a process of adjusting an fc error.

It is another object of the present invention to provide a focusing lens drive apparatus which dispenses with complicated adjusting mechanisms and methods which are required in the past in a fully automatic camera with a built-in zoom lens or of a two focal point switching type.

It is a further object of the present invention to provide a focusing lens drive apparatus which simultaneously eliminates an AF error in a range finder itself.

According to the present invention, an fc adjusting mechanism can be dispensed with and a process for an fc adjustment can be automatically effected, so that it will be of great advantage to cost and space reduction.

According to the present invention, since a plurality of fc adjusting operations are effected to a focal length in a fully automatic camera with a built-in zoom lens or of a two focal point switching type, it is possible to dispense with a complicated adjusting mechanism and method and thus it will be further great advantage to cost and space reduction.

According to the present invention, it is possible to relax the accuracy requirement in mechanical adjustment of a range finder.

DETAILED DESCRIPTION OF PREFERRED EMBODIMENTS

Figure 1:
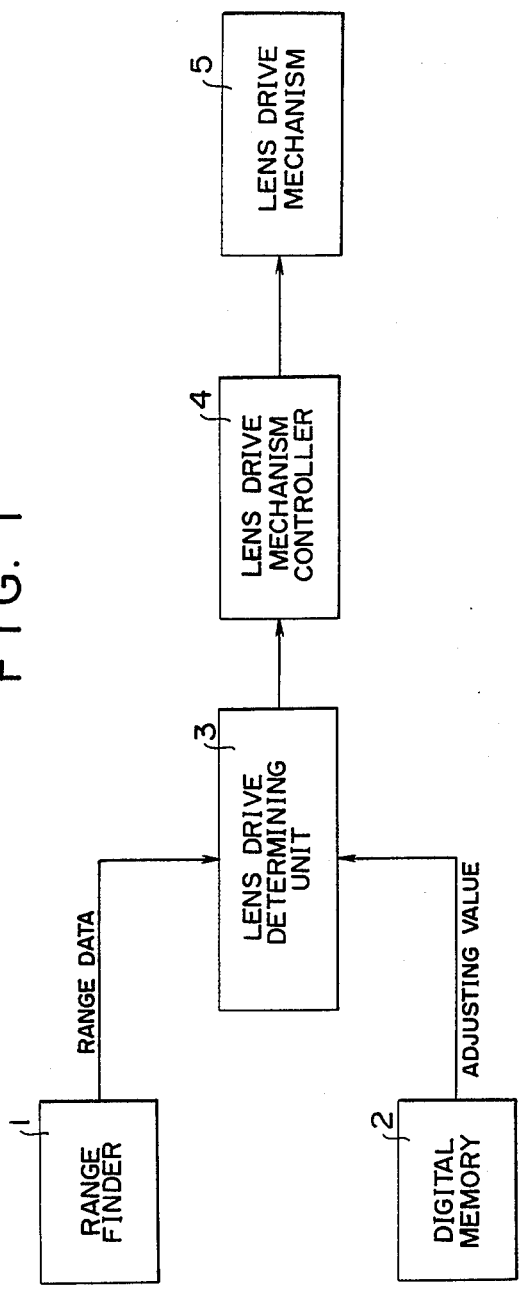
FIG. 1 is a block diagram illustrating a structure of a focusing lens drive apparatus according to the present invention.

As shown in FIG. 1, a focusing lens drive apparatus according to the present invention includes a range finder 1 for measuring a range to an object being photographed and a digital memory 2 for storing an adjusting value for focusing. An amount of driving a focusing lens is determined by a lens drive determining unit 3 on the basis of range data from range finder 1 and adjusting values stored in the digital memory 2. A lens drive mechanism controller 4 operates in accordance with an amount of driving a lens which is determined by the lens drive determining unit 3 to control a lens drive mechanism 5 for driving a focusing lens.

Figure 2:
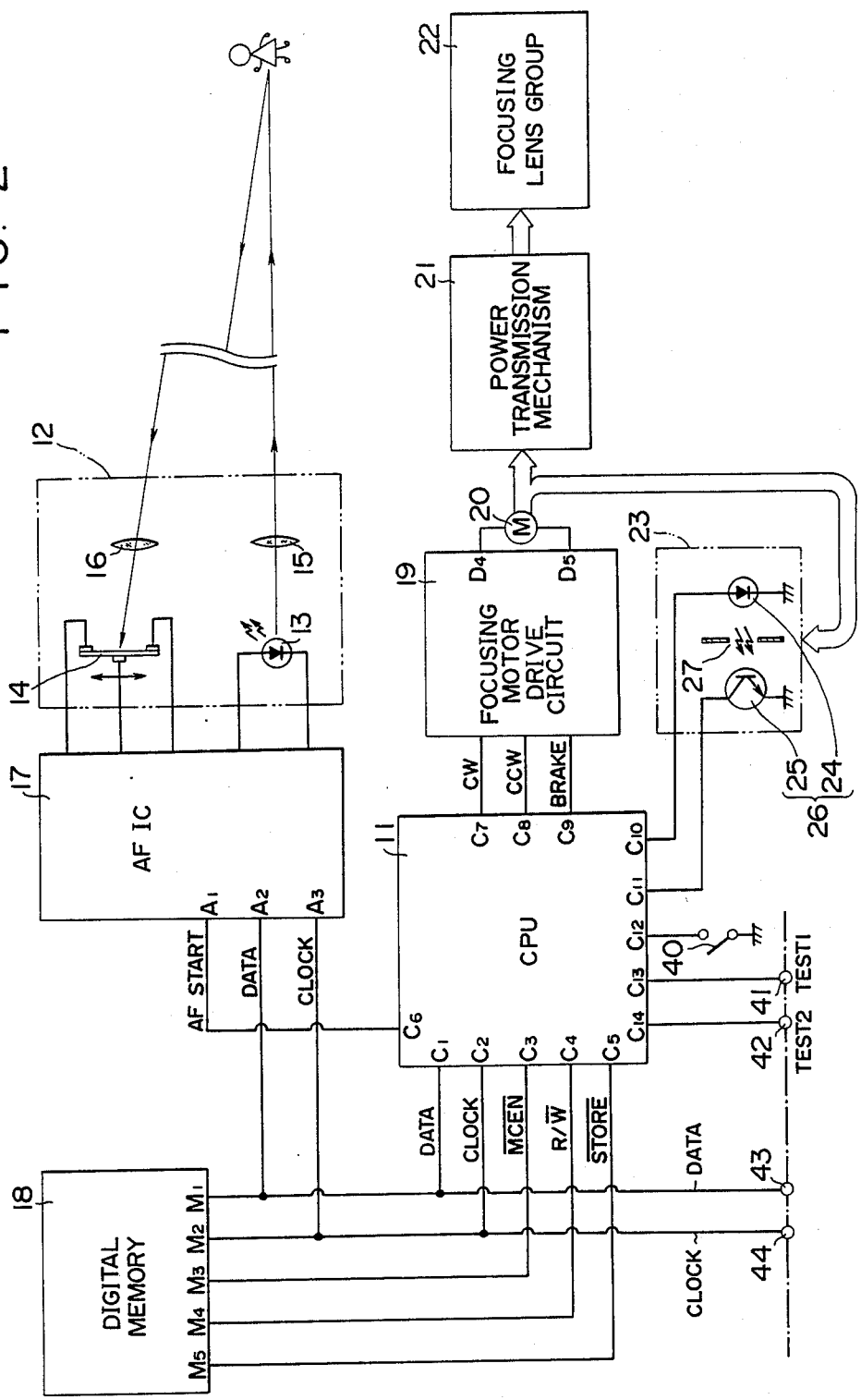
FIG. 2 is a block diagram illustrating a first embodiment of a focusing lens drive apparatus according to the present invention.

In FIG. 2, which shows a first embodiment of the present invention, a CPU 11 controls sequential operations of a camera. A range finder 12, which detects a range to an object being photographed on the basis of the principle of triangular range detection, comprises an LED (light emitting diode) 13 for projecting light, a PSD (position sensitive detector) 14, a light projecting lens 15 and a light receiving lens 16. An AFIC (autofocusing IC) 17 for driving the range finder 12 receives an AF START signal from a terminal C6 of the CPU 11 at a terminal A1 to initiate a range detection and feeds range data which correspond to a range to an object being photographed and are converted to serial form, from terminals A2 and A3 thereof through DATA and CLOCK signal lines to terminals C1 and C2 of the CPU 11, respectively. A digital memory 18, which stores adjusting values for focusing, has an EEPROM (electrically erasable and programmable read only memory) therewithin. Read-in and-out operations of adjusting values are controlled by delivering signals of $\overline{MCEN}$, $R/\overline{W}$ and $\overline{STORE}$ from terminals C3, C4 and C5 of the CPU 11 to terminals M3, M4 and M5 of the digital memory 18. Adjusting values stored in the digital memory 18 are fed from terminals M1 and M2 thereof through the DATA and CLOCK signal lines to terminals C1 and C2 of the CPU 11, respectively. Namely, the CPU 11 determines an amount of driving a focusing lens on the basis of adjusting values stored in the digital memory 18 and range data from the AFIC 17 and controls the driving of the lens in accordance with the determined driving amount.

The focusing lens is driven by a DC motor 20 connected between terminals D4 and D5 of a motor drive circuit 19. The motor drive circuit 19 drives the motor 20 with signals of CW, CCW and BRAKE from terminals C7, C8 and C9 of the CPU 11. A power transmitting mechanism 21 reduces the rotational speed of the motor 20 and transmits power to a focusing lens group 22. The focusing lens group 22 moves in or out by the power from the power transmitting mechanism 21.

An encoder 23, which monitors an amount of driving the focusing lens group 22, is connected to terminals C10 and C11 of the CPU 11 and comprises a photointerrupter 26 including an LED 24 and a phototransistor 25 and a rotatable slit 27. The CPU 11 delivers a drive signal from the terminal C10 thereof to the LED 24 while the focusing lens group 22 is driven. The slit 27 is rotated by the motor 20. The encoder 23 delivers encoder pulses to the terminal C11 of the CPU 11 while the slit 27 rotates. The CPU 11 monitors an amount of driving the focusing lens group 22 by counting the encoder pulses.

On the other hand, a release switch 40 is connected between a terminal C12 of the CPU 11 and an earth terminal. Contacts 41, 42, 43 and 44, provided for connecting the drive apparatus to an adjusting apparatus provided on the outside of a camera, are connected to terminals C13, C14, C1 and C2 of the CPU 11 to interchange signals of TEST 1, TEST 2, DATA and CLOCK with the CPU 11, respectively.

Figure 3:
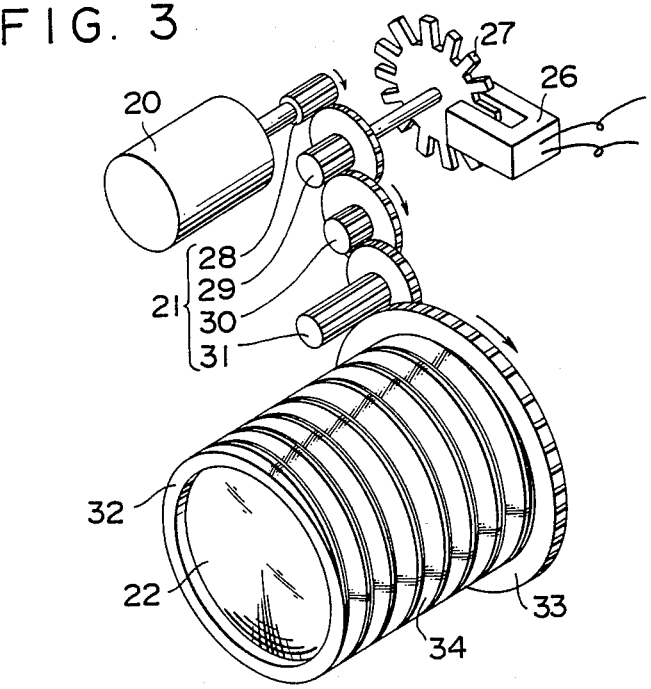
FIGS. 3 and 4 are a perspective view and a partial sectional view of the focusing lens drive apparatus, respectively.
Figure 4:
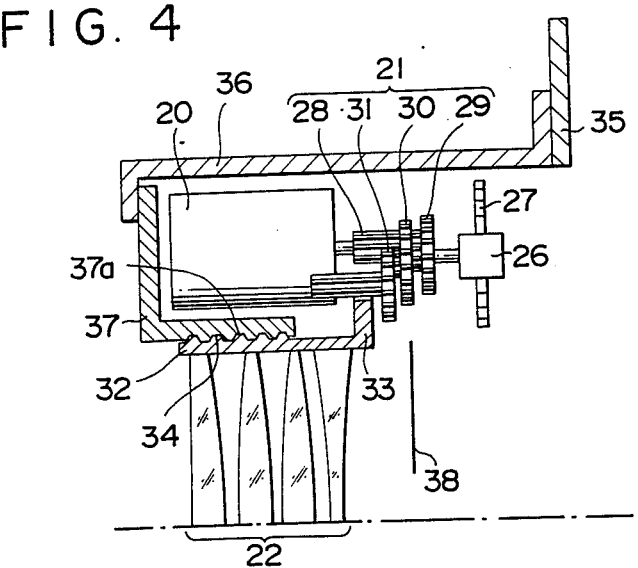

Now, mechanisms including the motor 20 will be described hereinafter with reference to FIGS. 3 and 4. In FIG. 3 a turning effort of the motor 20 is transmitted through a power transmitting mechanism 21 comprising a pinion gear 28 provided on an output shaft of the motor 20 and gears 29, 30 and 31 which mesh with the pinion gear 28 in order, to a gear 33 provided on a focusing frame 32 to rotate the focusing frame 32. The focusing frame 32 is provided with a helicoid 34 on the outer periphery thereof. In FIG. 4, a lens barrel 36 is fixedly mounted on a part 35 of a camera body. A fixed frame 37 is secured to the lens barrel 36. A helicoid is formed on the inner peripheral surface 37a of the fixed frame 37 so as to fit with the helicoid 34 provided on the focusing frame 32. The focusing lens group 22 is fixed to the inner periphery of the focusing frame 32. Accordingly, when the motor 20 rotates by a direction signal of CCW, the focusing frame 32 moves out relative to the fixed frame 37. When the motor 20 rotates by a direction signal of CW, the focusing frame 32 moves in relative to the fixed frame 37. The slit 27 is on the same shaft as that of the reduction gear 29 of the power transmitting mechanism 21, so that both rotate at the same speed. Numeral 38 represents a shutter blade.

Figure 5:
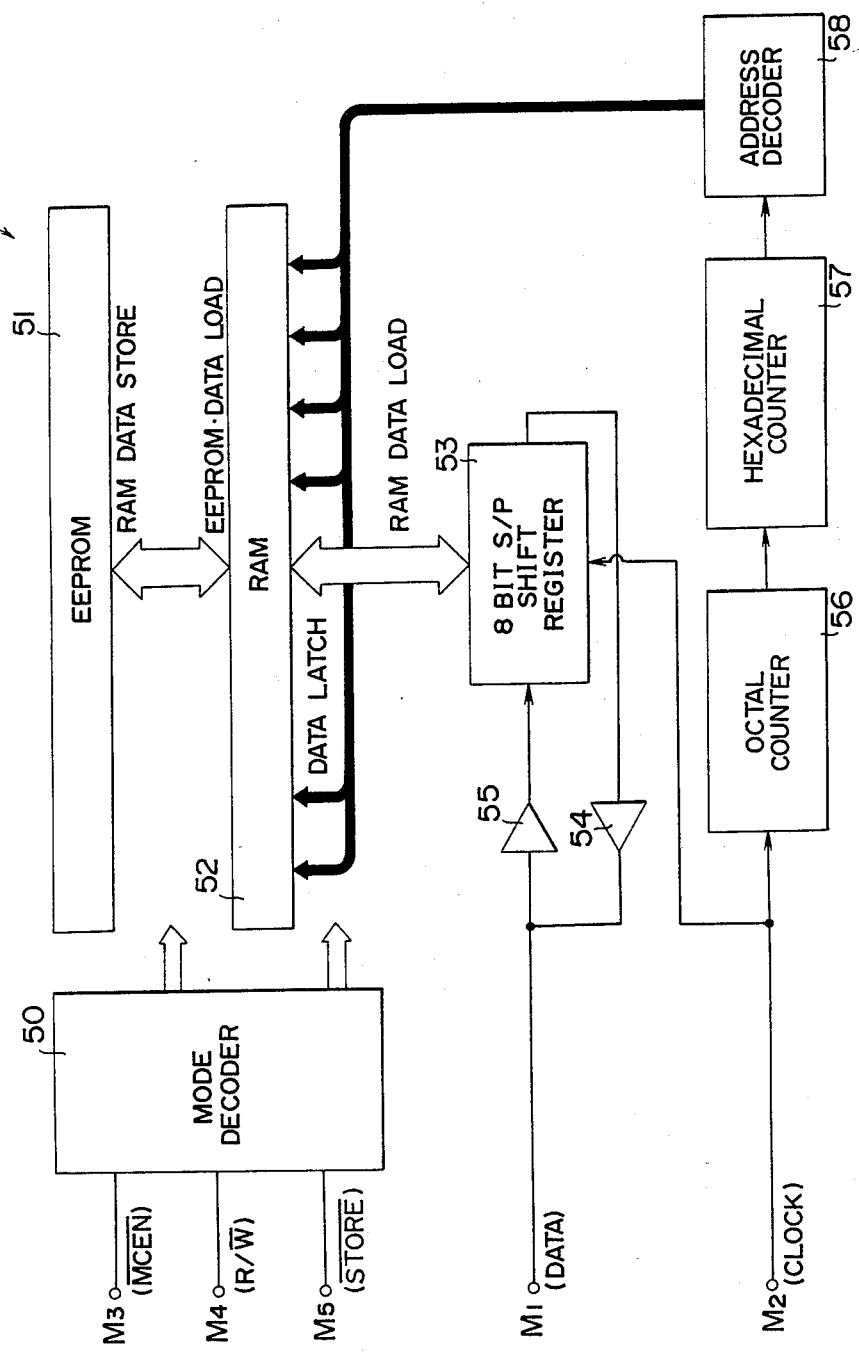
FIG. 5 is a block diagram of an electric circuit of a digital memory shown in FIG. 2.

Next, the internal structure of the digital memory 18 will be described in the following. The digital memory 18 is constructed as shown in FIG. 5. Characteristics of the EEPROM are that electrical writings are repeatedly enabled and data can be stored even when power is disconnected. The digital memory 18 includes EEPROM 51 and RAM 52, both of which have the same capacity (8 bits×16 words).

The RAM 52 serves to temporarily store data while the EEPROM 51 receives and delivers data. Terminals M3 to M5 are connected to a mode decoder 50 of the digital memory 18. The terminal M3 is a signal terminal for enabling operations of the digital memory 18.

When a signal $\overline{MCEN}$ (Memory Chip Enable) which is fed into the terminal M3 is at a low level (hereinafter referred to as "L"), the digital memory 18 is enabled for interchanging data with the CPU 11 and storing data of the RAM 52 in the EEPROM 51.

The terminal M4 is a signal terminal to indicate a direction of receiving and delivering data. When a signal $R/\overline{W}$ which is fed into the terminal M4 is at a high level (hereinafter referred to as "H"), the CPU 11 assumes a mode of reading out data and when at "L" it assumes a mode of writing data. The terminal M5 is a signal terminal to indicate a timing of storing data of the RAM 52 in the EEPROM 51. When a signal $\overline{MCEN}$ at the terminal M3 and a signal $R/\overline{W}$ at the terminal M4 are both at "L", all data of the RAM 52 are stored in the EEPROM 51 when a signal $\overline{STORE}$ at the terminal M5 is set to "L".

Operations of the digital memory 18 are described hereinafter with reference to timing charts shown in FIGS. 6 and 7.

Figure 6:
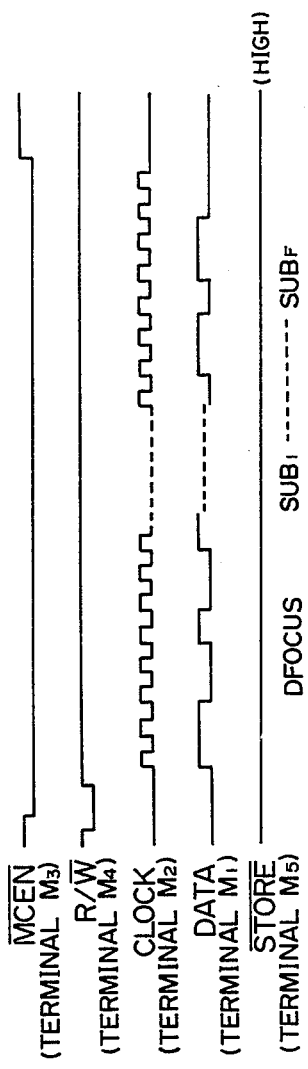
FIGS. 6 and 7 are timing charts of signals of various units for explaining operations of the electric circuit shown in FIG. 5.

FIG. 6 is a timing chart when data are read out from EEPROM 51. When a signal $\overline{MCEN}$ at the terminal M3 is set to "L" while a signal $R/\overline{W}$ at the terminal M4 is at "L" and subsequently the signal R/W is set to "H", all data of adjusting values stored in the EEPROM 51 are transferred to the RAM 52. At this time, an S/P (serial/parallel) shift register 53 of 8 bits assumes a parallel-in serial-out mode and reads in data (8 bits) at the zero address in the RAM 52. Subsequently, the shift register 53 shifts input data whenever a clock signal CLOCK at the terminal M2 turns from "L" to "H" and delivers the shifted data as DATA signals through a buffer 54 and the terminal M1 to the terminal C1 of the CPU 11. The CPU 11 stores successively "H" and "L" of the DATA signals from seventh to zero bits at B0 address of the RAM within the CPU 11.

The CPU 11 completes the delivery of all data in the shift register 53 at the rise of a CLOCK signal of the eighth bit. When the CLOCK signal rises after that, an octal counter 56 overflows and adds +1 in a hexadecimal counter 57. As a result, the shift register 53 reads in data at the address 1 of the RAM 52 by an address decoder 58. Thereafter, whenever a CLOCK signal rises, DATA signals are delivered. As a result, all data at addresses 0 to 15th of the RAM 52 are delivered to the CPU 11 and the CPU 11 stores them in addresses B0 to BF. Data of 8 bits×16 words stored at the addresses B0 to BF are adjusting values of different kinds. Adjusting values DFOCUS for focusing which are employed in the embodiment are data stored at the address B0 and data SUB1 to SUBF of 15 kinds stored at the address B1 to BF are other adjusting values which have no immediate connection with the present invention.

Figure 7:
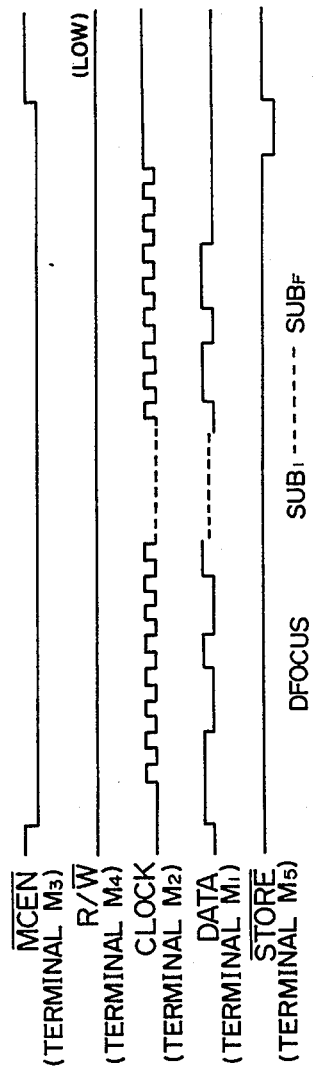

FIG. 7 is a timing chart of various signals when data are stored in the EEPROM 51. When an $\overline{MCEN}$ signal at the terminal M3 is first set to "L" while an R/W signal at the terminal M4 is at "L", the shift register 53 assumes a serial-in parallel-out mode. When the CPU 11 delivers data of the seventh bit at the address B0 in the RAM thereof to the terminal M1, the digital memory 18 reads "H" or "L" of data of adjusting values DFOCUS which are fed from the CPU 11 through the buffer 55 to the shift register 53 when a CLOCK signal at the terminal M2 turns from "L" to "H".

Thereafter, the CPU 11 successively renews data of adjusting values DFOCUS at a timing of the fall of CLOCK signals and the digital memory 18 stores data of adjusting values DFOCUS at a timing of the rise of CLOCK signals. Data of adjusting value DFOCUS at the address B0 in the RAM of the CPU 11 is stored at the address O of the RAM 52 when the CLOCK signal of the eighth bit rises. After this, the CPU 11 successively delivers data of SUB1 to SUBF at addresses B1 to BF in the RAM thereof. These data are stored at addresses of 1 to F in the RAM 52. After completing the delivery of all data, the CPU 11 turns a $\overline{STORE}$ signal at the terminal M5 to "L". At this time, all data in the RAM 52 are stored in the EEPROM 51.

As such, all data in the EEPROM 51 are read out and in together.

Accordingly, when only one adjusting value is to be renewed, after all data in the EEPROM 51 are once introduced into the addresses B0 to BF of the RAM of the CPU 11 and then only a datum at a required address is renewed, data at addresses B0 to BF must be again read in the EEPROM 51.

Figure 8:
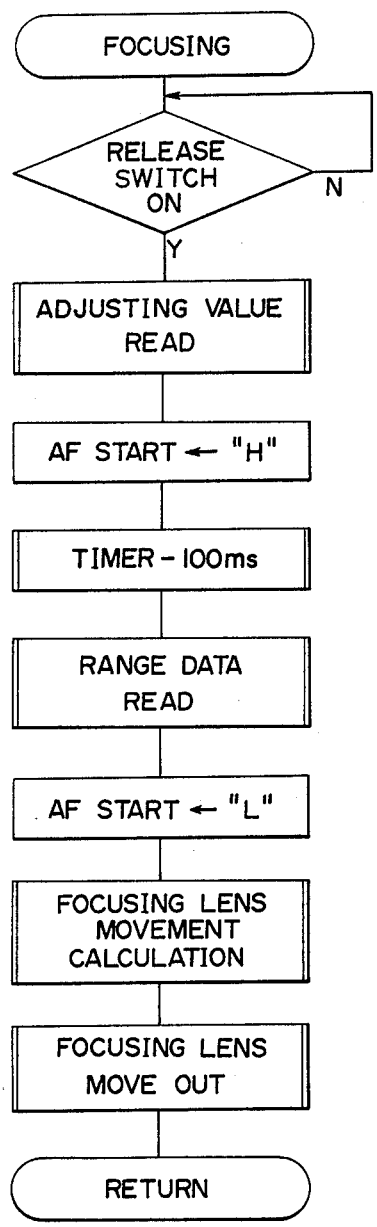
FIGS. 8 and 9 are flow charts for explaining operations of a CPU shown in FIG. 2.

In operation, while the CPU 11 controls all sequential operations of a camera, only a flow of focusing operations related to the present invention will be described hereinafter with reference to a flow chart shown in FIG. 8.

When the release switch 40 turns on, a flow of the focusing operations is initiated. First, the CPU 11 communicates data with the digital memory 18 and stores data DFOCUS of 8 bits for adjusting the focusing operation which are stored at the address O of the EEPROM 51, at the address B0 of the RAM in the CPU 11. Next, the CPU 11 delivers a signal AFSTART at "H" from an output terminal C6 thereof. The AFIC 17 has functions of dividing a scope of photographable range into fifteen zones, detecting which zone an object being photographed falls in, and delivering an output of the detected zone as a result of range detection. The relations between ranges to an object being photographed and the zones (results of range detection) are as shown in the following Table 1.

TABLE 1

| Results of range detection | Ranges to an object being photographed [m] |
|---|---|
| 0 | 6.3–∞ |
| 1 | 4.2–6.3 |
| 2 | 3.2–4.2 |
| 3 | 2.5–3.2 |
| 4 | 2.1–2.5 |
| 5 | 1.8–2.1 |
| 6 | 1.6–1.8 |
| 7 | 1.4–1.6 |
| 8 | 1.3–1.4 |
| 9 | 1.2–1.3 |
| 10 | 1.1–1.2 |
| 11 | 1.0–1.1 |
| 12 | 0.95–1.0 |
| 13 | 0.9–0.95 |
| 14 | 0.85–0.9 |

The AFIC 17 initiates the range detection when receiving a signal AFSTART and completes the range detection within a predetermined time (100 ms in the present embodiment).

The CPU 11 operates a timer of 100 ms after delivering the AFSTART signal and awaits the completion of range detection in the AFIC 17. Upon the completion of operation of the 100 ms timer, the CPU 11 communicates data with the AFIC 17 to read in detected range data of 8 bits.

A method of the data communication is effected in serial communication such that data of 8 bits are successively read in from the input terminal C1 of the CPU 11 as DATA signals in synchronism with the rise of CLOCK signals from the output terminal C2 of the CPU 11. Then, the CPU 11 stores this data in the address of C of the RAM as measured range data STEP.

Upon the completion of communicating with the AFIC 17, the CPU 11 turns a signal AFSTART to "L" and subsequently calculates an amount of moving out a focusing lens. The amount N of moving out the focusing lens (the number of encoder pulses) can be determined by the following equation from an adjusting value DFOCUS for focusing which is stored at the address B0 of the RAM and a detected range datum STEP which is stored at the address C of the RAM.

$$N = DFOCUS + STEP \times 8 + 30$$

One step of the detected range data STEP corresponds to eight encoder pulses. The adjusting value DFOCUS corresponds to an amount of correction in the number of encoder pulses. In addition, the constant 30 of the third term in the above equation corresponds to an amount of moving out the focusing lens when STEP=0. The amount is a marginal value for mechanical adjustment when the adjusting value DFOCUS is negative so as to cancel the amount of correction.

Figure 9:
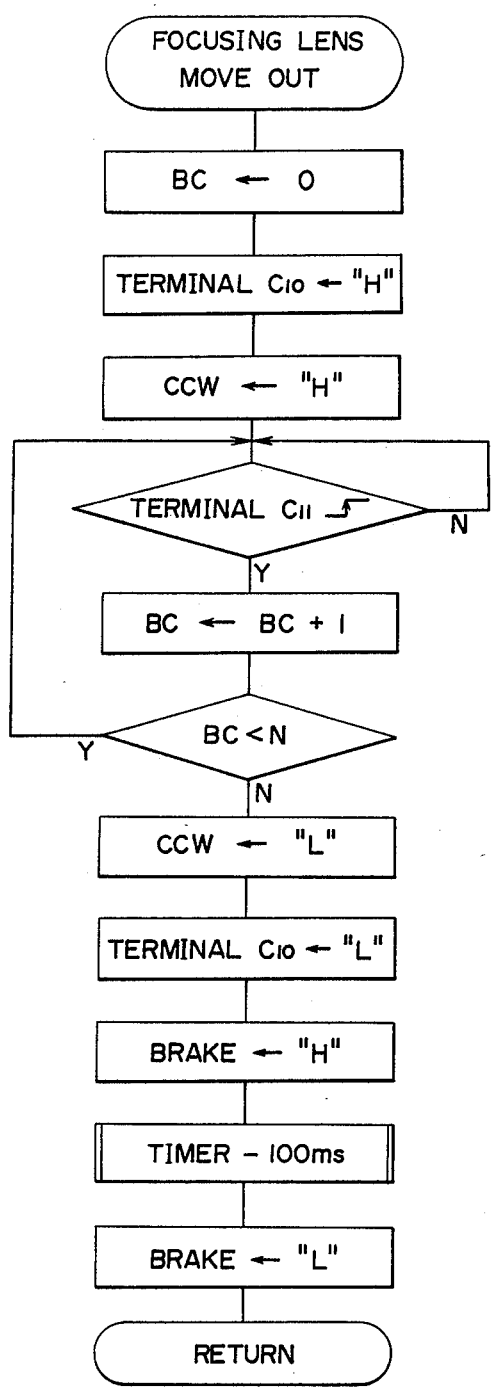

Upon the completion of calculating the amount of moving out the focusing lens, the focusing lens is then moved out. This flow will be described with reference to FIG. 9 in the following. First, a value in a BC register within the CPU 11 is set to 0. Next, a terminal C10 of the CPU 11 is set to "H" to turn the LED 24 in the photointerrupter 26 on. Subsequently, a direction signal CCW which is delivered from the output terminal C8 is set to "H". As a result, the focusing motor drive circuit 19 produces a drive current to rotate the motor 20 by the direction signal CCW and thus the focusing lens group 22 starts to move out. Next, the CPU 11 monitors a level of the input terminal C11, that is, a level of an output from the phototransistor 25 and adds +1 to a value of the BC register upon every change of "L" to "H". When a value in the BC register becomes equal to an amount N of driving the focusing lens (the number of encoder pulses), a level at the output terminal C8, that is, a level of a signal CCW, is set to "L". As a result, the focusing motor drive circuit 19 stops the power supply to the motor 20. Subsequently, after the output terminal C10 of the CPU 11 is set to "L" and the LED 24 is turned off, a level of the output terminal C9, that is, a level of a signal BRAKE is set to "H". As a result, the focusing motor drive circuit 19 has the motor 20 short-circuited to brake. Then, the CPU 11 activates the timer of 100 ms. Upon the completion of the timer operation, a level of the output terminal C9, that is, a level of a signal BRAKE is set to "L" to terminate the braking action and the flow of focusing operations is completed.

In the sequential operations of a camera, the focusing operation is followed by a shutter release operation, release returning operation (returning the focusing lens to its initial position) and film winding operation and these operations are not directly related to the present invention, so that their description will be omitted.

It is to be noted that an adjusting value DFOCUS should be previously stored in the digital memory 18. An apparatus and a method for storing a DFOCUS value will be described hereinafter.

Figure 10A:
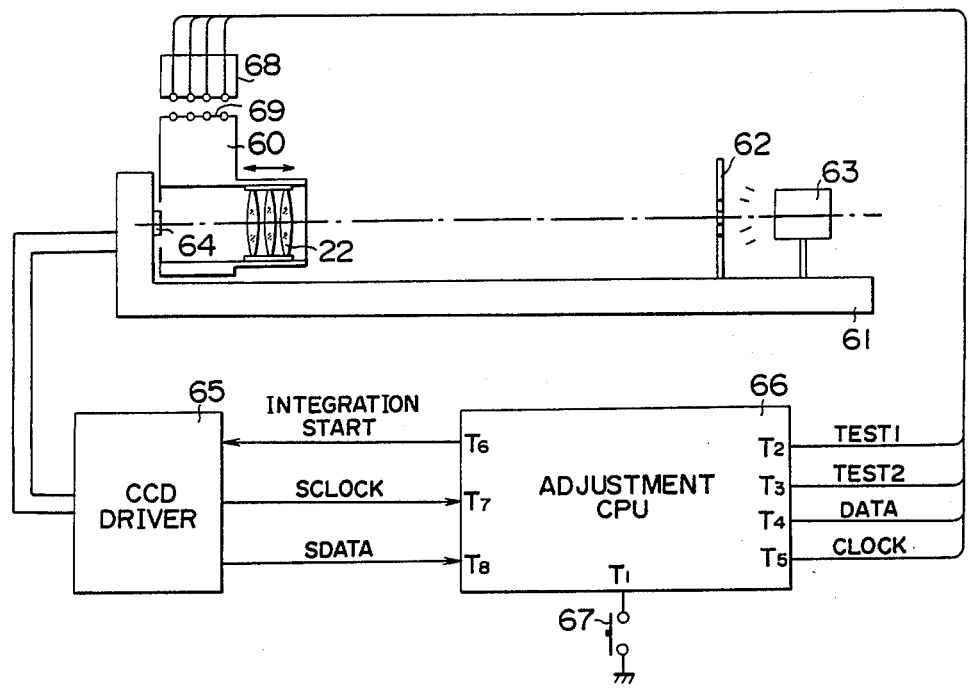
FIG. 10A is a schematic diagram of an example of an adjusting mechanism for a focusing operation which is used in the first embodiment shown in FIG. 2.

FIG. 10A is a schematic diagram of an adjusting apparatus. A camera 60 to which a focusing lens drive apparatus of the embodiment is applied is rested on one end of an adjusting stand 61. A screen 62 and a light sorce 63 are mounted adjacent to the opposite end of the stand 61. The screen 62 has a striped perforation pattern. A CCD line sensor 64 is provided adjacent to the one end of the stand 61. The CCD line sensor 64 is disposed vertically on the sheet plane. The camera 60 is positioned in such a manner that the film surface thereof is on the same plane as the light receiving plane of the CCD line sensor 64 and the optical axis of the focusing lens group 22 coincides with the center of the CCD line sensor 64. A CCD driver 65 drives the CCD line sensor 64, performs an A/D conversion of an output of the line sensor and transfers a signal from and to a CPU 66 for use in adjustment. A start switch 67 for starting sequential operations of the adjustment is connected to an input terminal T1 of the adjusting CPU 66. Terminals T2, T3, T4 and T5 are connected through a connector 68 to a contact group 69 (contacts 41 to 44 shown in FIG. 2) which is provided externally of the camera 60.

Figure 12:
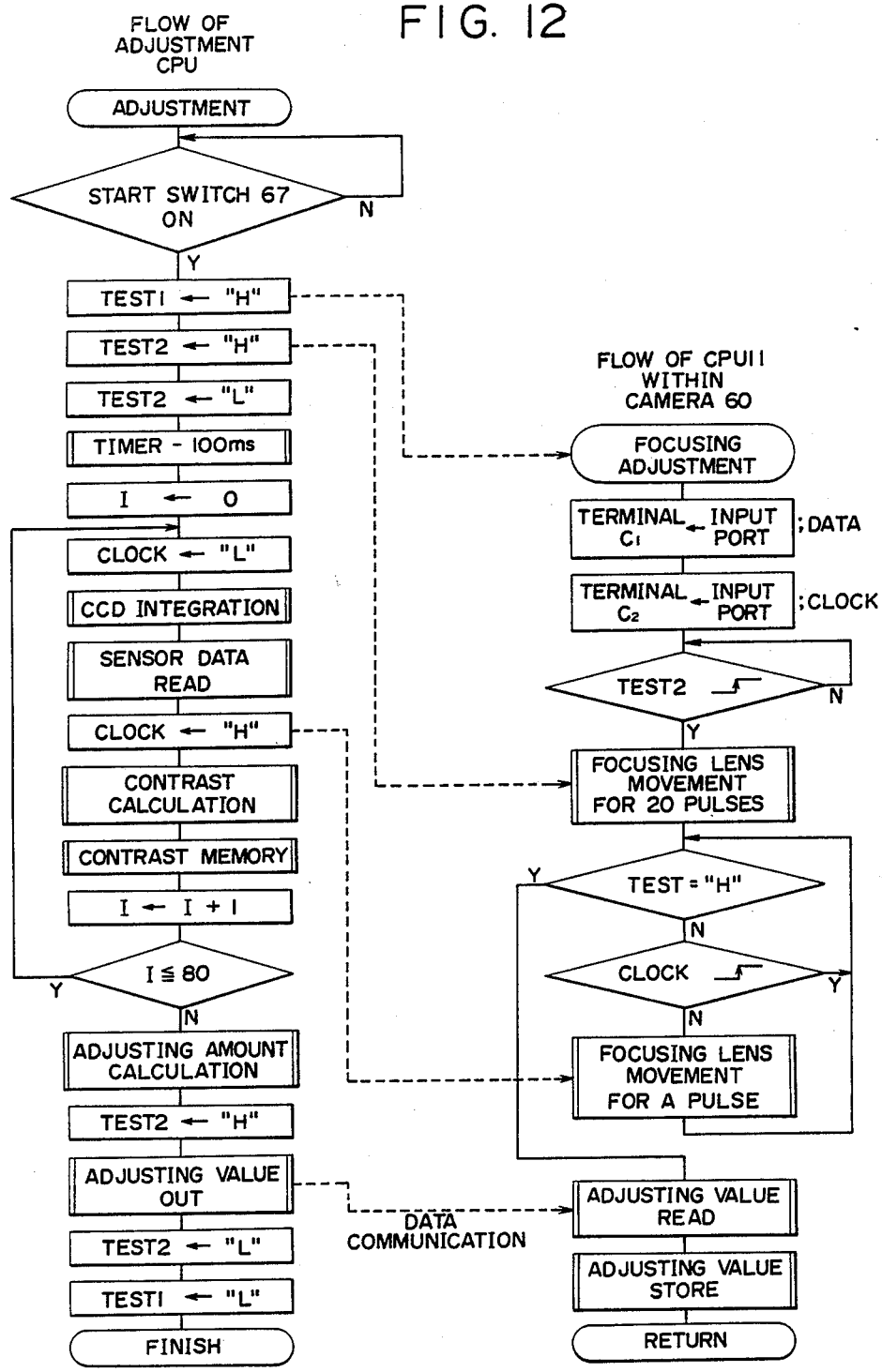
FIG. 12 is a flow chart for explaining focusing adjusting operations in a CPU for use in the adjustment and a CPU within a camera in the first embodiment shown in FIG. 2.

In operation, in sequential operations of the adjustment shown in FIG. 12, the adjusting CPU 66 functions as a master CPU and the CPU 11 within a camera functions as a slave CPU. Flow charts for the adjusting CPU 66 and the CPU 11 within a camera are separately shown in FIG. 12.

When the start switch 67 turns on, the adjusting CPU 66 delivers a signal TEST 1 at "H" from the output terminal T2. As a result, the camera CPU 11 detects the rise of the signal TEST 1 to enter a flow of a routine <FOCUSING ADJUSTMENT>. The camera CPU 11 first assigns the input and output terminal (DATA) C1 and input and output terminal (CLOCK) C2 to a direction of an input port. Next, the adjusting CPU 66 delivers a signal TEST 2 at "H" from the output terminal T3. As a result, the camera CPU 11 detects the rise of the signal TEST 2 to move out the focusing lens group 22 by twenty encoder pulses. The adjusting CPU 66 operates the timer of 100 ms after setting the signal TEST 2 to "L" and awaits completion of moving out the focusing lens group 22. The adjusting CPU 66 sets a parameter I to "0" and enters a flow of detecting contrast, which is the flow operations CLOCK "L" to I←I+1. First, a signal CLOCK at "L" is produced from the output terminal T5. Next, a CCD integration is effected in the CCD line sensor 64. The CCD integration is initiated by setting an integration start signal which is delivered from the output terminal T6 to the CCD driver 65 to "H". Upon the completion of the CCD integration, the CCD driver 65 delivers a sensor data signal SDATA which has been achieved by an A/D conversion to the input terminal T8 of the adjusting CPU 66. The sensor data signal SDATA, which is a serial signal of 8 bits×128, is stored in the adjusting CPU 66 from the CCD driver 65 in synchronism with the rise of a signal SCLOCK which is fed to the input terminal of the adjusting CPU 66.

Next, when the adjusting CPU 66 sets a signal CLOCK to "H", the camera CPU 11 detects the rise of the signal CLOCK and moves out the focusing lens group 22 by one encoder pulse. The adjusting CPU 66 calculates a contrast on the basis of a sensor data signal SDATA which is read in the next time. The contrast calculation can be determined by the following equation, for example.

$$\text{A contrast value} = \sum_{i=1}^{127} (X_{i+1} - X_i)^2$$

where Xi is a value of the ith term in sensor data of 128.

The contrast value thus determined is stored in a memory. Subsequently, the flow of the contrast detection is completed by adding +1 to the parameter I. The adjusting CPU 66 repeats the flow of contrast detection 80 times. Subsequently, the adjusting CPU 66 calculates an adjustment value DFOCUS.

Figure 11:
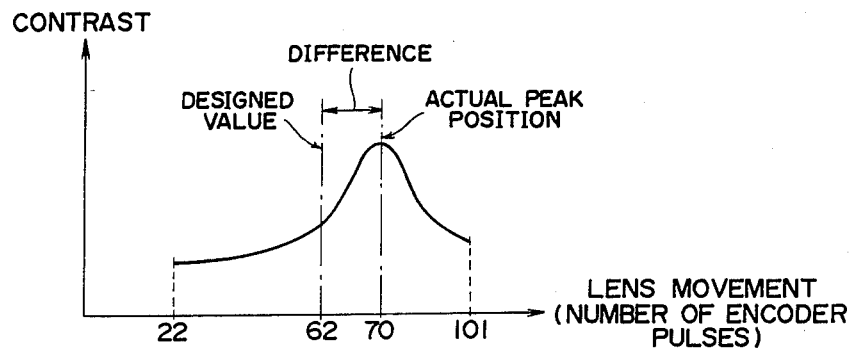
FIG. 11 is a diagram illustrating variation in contrast values to movement of a focusing lens during a focusing adjusting operation.

The relation between an amount of moving out the focusing lens group 22 and a contrast value is already known by the contrast detection of 80 times. Let it be supposed that the relation is as shown in FIG. 11, for example. First, a position of the focusing lens group 22 such as a contrast value becomes a peak is determined.

In an example shown in FIG. 11, an amount of moving out the lens at its peak (the number of encoder pulses) is 70 pulses. Now, assuming that the peak position by design is at 62 pulses in terms of an amount of moving out the lens, it follows that the peak position is shifted by +8 pulses because of workmanship of mechanisms provided around the focusing motor 20. This corresponds to an fc error. Accordingly, a value +8 is determined as an adjusting value DFOCUS for focusing.

The adjusting CPU 66 delivers an adjusting value DFOCUS to the camera CPU 11 after setting a signal TEST 2 to "H". The camera CPU 11 is standing by ready to read in the adjusting value DFOCUS under the condition that the signal TEST 2 is at "H". The value DFOCUS delivered from the adjusting CPU 66 is a serial data of 8 bits in which the 0 to 6th bits represent an absolute value of the adjusting value and the 7th bit represents a sign thereof. When the value DFOCUS is +8, its serial data is 10001000 in order from MSB.

The camera CPU 11 successively reads in the serial data in synchronism with the rise of a signal CLOCK delivered from the CPU 66 to store at the address D in the RAM.

Upon completion of the above described data communication, the adjusting CPU 66 sets signals TEST 2 and TEST 1 to "L" and completes the sequential operations of the adjustment. The camera CPU 11 reads in the adjusting value DFOCUS and stores the value in the digital memory 18. The procedure of reading in the adjusting value is as described above. First, adjusting values stored in addresses D to 15 within the EEPROM 51 of the digital memory 18 are collectively read in the addresses BO to BF of the RAM in the camera CPU 11 and data in the address BO is exchanged for the adjusting value DFOCUS stored in the address D. Then, contents in the addresses BO to BF are again stored in the EEPROM 51 in the digital memory 18. Thus, the camera CPU 11 completes a sequence of operations for the focusing adjustment.

As described above it is possible to dispense with an fc adjusting mechanism and to automate processes of an fc adjustment by utilizing the above embodiment.

The first embodiment described above can be variously modified.

Figure 10B:
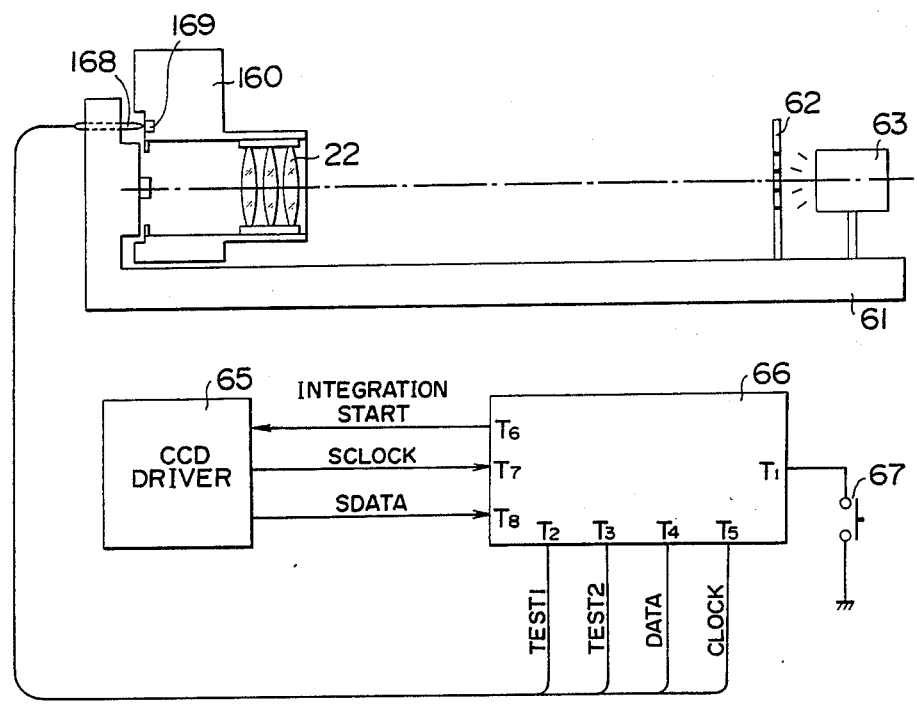
FIG. 10B is a schematic diagram of another example of an adjusting mechanism for a focusing operation.

In the embodiment, while the adjusting CPU 66 and the camera 60 are connected through the connector 68, they may be connected through the adjusting stand 61. By way of example, as shown in FIG. 10B, terminals T2, T3, T4 and T5 are connected through a test pin 168 provided on the stand 61 to a contact group 169 (contacts 41 to 44 shown in FIG. 2) provided on the camera. It is preferred that the contact group 169 be provided in a position where it is not externally seen when the camera is in a normal use but is externally exposed when a back lid of the camera is opened, namely, on the back lid which is put on the secondary appearance of its opened state.

In the embodiment, the contact group 169 is shared with contacts for use in a data back which is a back lid of a camera with a built-in data taking module.

Figure 10C:
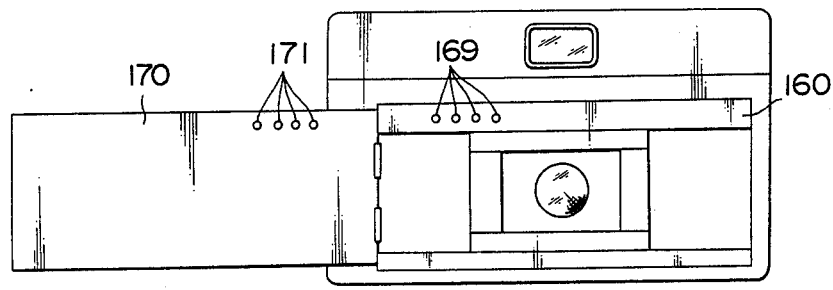
FIG. 10C is a rear elevation of a state in which a camera back lid for use in the adjusting mechanism shown in FIG. 10B is opened.

FIG. 10C shows the state in which a back lid of a camera is opened.

A contact group 169 in the shape of a circular flat board is provided on a camera body 160. A contact group 171, with each contact in the shape of a pin, is provided on a data back 170 so as to be opposite to the contact group 169. Namely, signal transmission between the adjusting apparatus and the camera body 160 is primarily effected by utilizing contacts for effecting communication between the camera body 160 and the data back 170. In addition, the four pins 168 for use in a test (not shown in FIG. 10C) are arranged in a direction perpendicular to the sheet plane so that they are in contact with the respective contact group 169 for the data back.

As set forth above, since the signal contacts for communicating between the adjusting apparatus and the camera body are provided on the back lid which is put on the secondary appearance, there are advantages that the signal contacts can be prevented from being inadvertently externally exposed when the camera is in a normal use and the camera body can be set up on the adjusting apparatus in a single operation when adjusted. In addition, a DX contact (contact for detecting information of a film on a cartridge) may be used in place of the contact for the data back.

In the embodiment, while the EEPROM is employed for the digital memory 18 for storing adjusting values, other digital memories may be utilized. By way of example, a PROM (programmable ROM) may be employed. When a PROM is employed, however, the storing of adjusting values is limited to only once. Also, a RAM may be employed. When a RAM is employed, it is necessary to add a backup cell so that contents in the RAM are not erased when a cell in a camera is exchanged.

Further, while in the above embodiment, the range finder 12 is employed to measure a range on the basis of the triangular range detection system using the PSD 14, other range detection systems may be used. By way of example, a passive triangular range detection system or a ultrasonic sonar range detection system may be used.

In addition, while an DC motor is employed as the motor for driving the focusing lens group 22 in the embodiment, motors of other kinds may be used. For example, a pulse motor may be used. When a pulse motor is used, it is possible to dispense with the encoder 23 since there is an accurate relation between the number of pulses applied to a motor and a revolutional angle thereof. In place of a DC motor, an ultrasonic motor may be used. An ultrasonic motor has this features that a high torque and low speed rotation can be obtained, so that the power transmission mechanism 21 (reduction mechanism) can be dispensed with.

Further, a drive mechanism not using the motor drive actuator as described above may be employed. By way of example, a focusing lens can be driven by a spring for driving a focusing lens which is charged in cooperation with an operation such as a film winding operation and is retained its charged condition, by releasing a lock mechanism thereof and can be stopped by releasing a hook previously attracted to a magnet when the focusing lens is driven by a predetermined amount.

Figure 13:
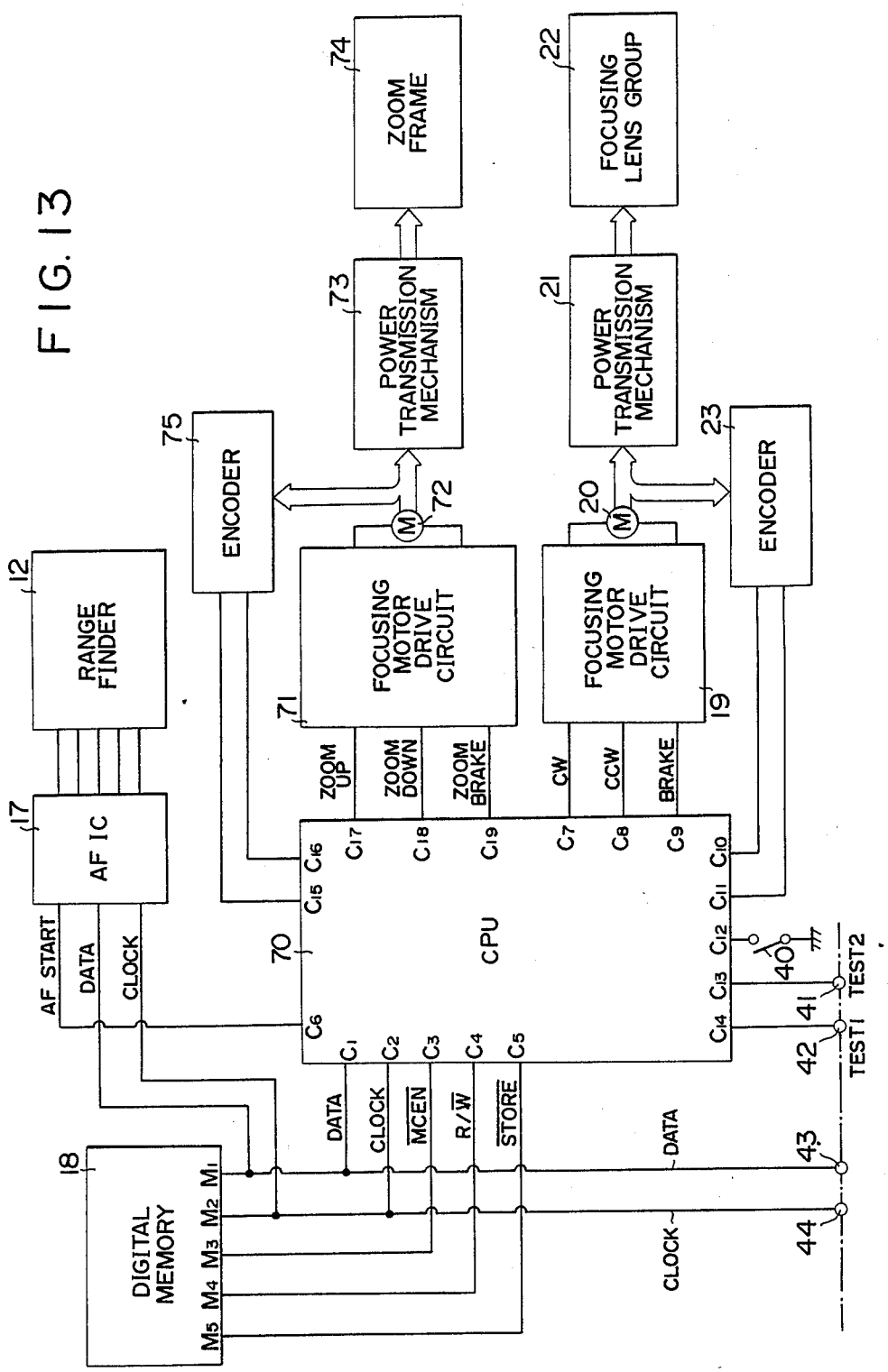
FIG. 13 is a block diagram illustrating a second embodiment of a focusing lens drive apparatus according to the present invention.

A second embodiment of the present invention will be described hereinafter with reference to FIG. 13. In FIG. 13, like elements as those shown in FIG. 2 have the same functions and their description will be omitted.

A distinction of the second embodiment over the first embodiment is that a motor drive zooming mechanism is added. When receiving signals of ZOOM UP, ZOOM DOWN and ZOOM BRAKE from output terminals C17, C18 and C19 of a CPU 70, a zooming motor drive circuit 71, delivers respective drive signals to a zooming motor 72. A power transmission mechanism 73 transmits power to a zoom frame 74 after reducing the speed of the zooming motor 72. An encoder 75 connected between terminals C15 and C16 of the CPU 70 monitors an amount of rotation of the zoom frame 74 and its structure is the same as that of the encoder 23 for monitoring an amount of movement of the focusing lens group 22.

Figure 14:
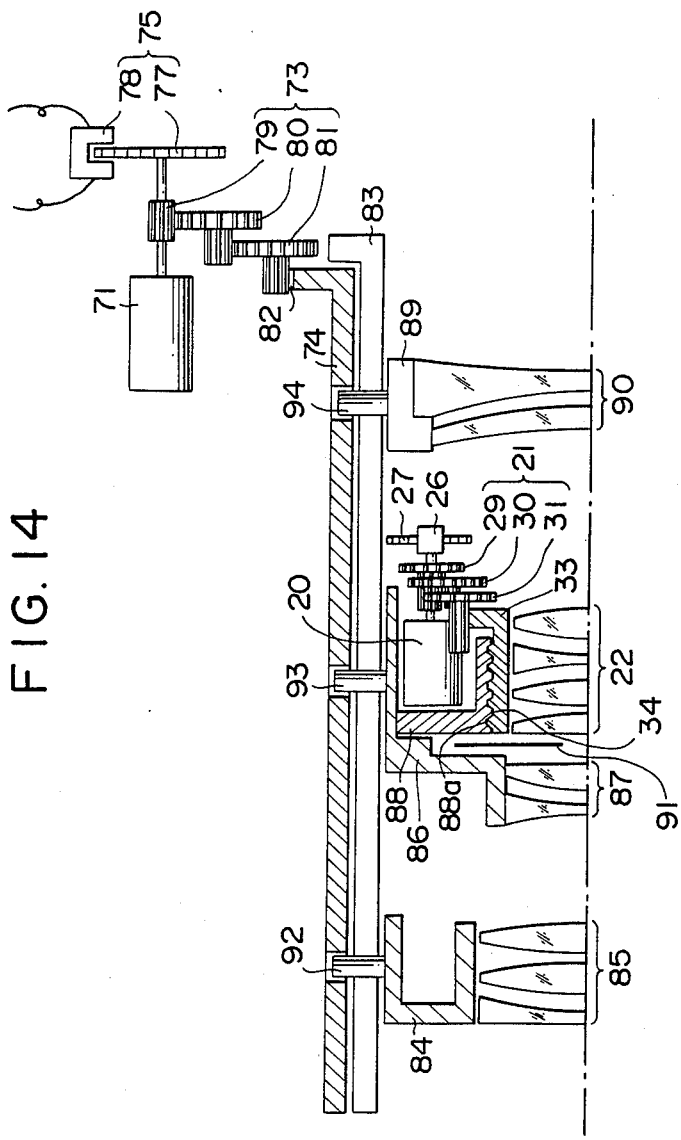
FIGS. 14 and 15 are a sectional view and a partially perspective view of a lens drive mechanism in the second embodiment shown in FIG. 13, respectively.
Figure 15:
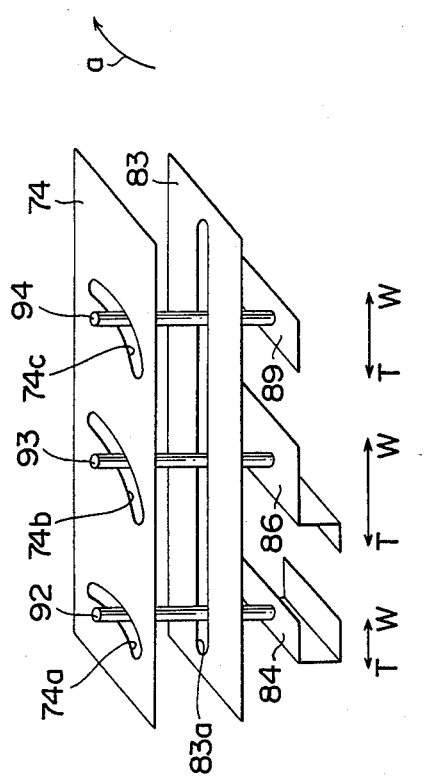

Mechanical members of the second embodiment will be described with reference to FIGS. 14 and 15. In FIGS. 14 and 15, like elements as those shown in FIGS. 3 and 4 have the same structures and functions. A rotary slit 77 of the same structure as that of the slit 27 shown in FIG. 3 is secured to an output shaft of the zooming motor 71. An encoder 75 comprising the rotary slit 77 and a photointerrupter 78 monitors an amount of rotation of the zooming motor 71, that is, that of the zoom frame 74. A power transmission mechanism 73 comprises a pinion 79 secured to the output shaft of the zooming motor 71 and reduction gears 80 and 81 meshed therewith in order. A gear 82 engaging with the gear 81 is formed at the rear end of the zoom frame 74 which is movably fitted on a fixed frame 83. Accordingly, when the zooming motor 71 rotates by a direction signal of ZOOM UP, the zoom frame 74 rotates relative to the fixed frame 83 in a direction indicated with an arrow a in FIG. 15. A first lens group 85 is secured to a first group frame 84 and a second A lens group 87 is secured to a second group A frame 86. A focusing frame 33 to which the focusing lens group 22 is secured and having a helicoid 34 is fitted in a second group B frame 88 with the helicoid 34 threadably engaging with a helicoid formed on an inner peripheral surface 88a of the second group B frame 88. The second group B frame 88 is secured to the second group A frame 86. A third lens group 90 is secured to a third group frame 89. A shutter blade 91 is provided between the focusing lens group 22 and the second A lens group 87.

First, second and third group pins 92, 93 and 94 are respectively provided on first, second and third group frames 84, 86 and 89.

These pins fit in curvedly elongated holes 74a, 74b and 74c formed on the zoom frame 74 respectively after passing through a rectilinearly elongated slot 83a formed on the fixed frame 83. Accordingly, when the zoom frame 74 rotates in a direction indicated by an arrow a, each of the lens frames, that is, each of lens groups is moved out. In the second embodiment, the condition that each of the lens groups is moved out frontmost is a telephoto-condition (T—a long focus point side) and the condition that each of lens groups is moved in rearmost is a wide-condition (W—a short focus point side). Accordingly, when the zooming motor 71 rotates by a direction signal of ZOOM UP, the zoom frame 74 rotates in a direction indicated by the arrow a to zoom up. When the zooming motor 71 rotates by a direction signal of ZOOM DOWN, the zoom frame 74 rotates reversely to zoom down.

In the second embodiment, the focusing lens group 22 moves with rotation of the focusing motor 20 and the movement is relative to the second group B frame 88 which moves in the zooming operation.

Figure 16:
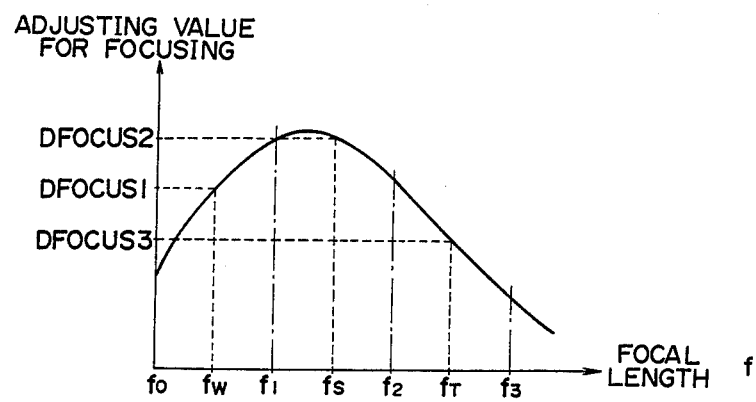
FIG. 16 is a diagram illustrating the relation between focal lengths and adjusting values for focusing in the second embodiment shown in FIG. 13.

A problem which is caused when a zooming mechanism described above is added is that an fc error varies with a focal length of a taking lens. Accordingly, an adjusting value for focusing varies on each focal length as shown in FIG. 16. In FIG. 16, the abscissa indicates a focal length f. Reference f0 represents a threshold focal length on the wide side and reference f3 represents a threshold focal length on the telephoto side.

In the second embodiment, in a step of the adjustment, three adjusting values are determined on three typical focal lengths and stored in the digital memory 18. Namely, a scope of variation in focal length is divided into three zones. The relation $f0 \leq f < f1$ indicates a wide zone and the intermediate focal length is denoted by fW.

The relation $f2 \leq f \leq f3$ indicates a telephoto zone and the intermediate focal length is denoted by fT. The relation $f1 \leq f < f2$ indicates an intermediate zone and the intermediate focal length is denoted by fS. In the adjusting step, adjusting values for focusing DFOCUS 1, DFOCUS 2 and DFOCUS 3 are determined on focal lengths, fW, fS and fT and stored in the addresses 0 to 2 in the EEPROM 51 of the digital memory, respectively.

Figure 17:
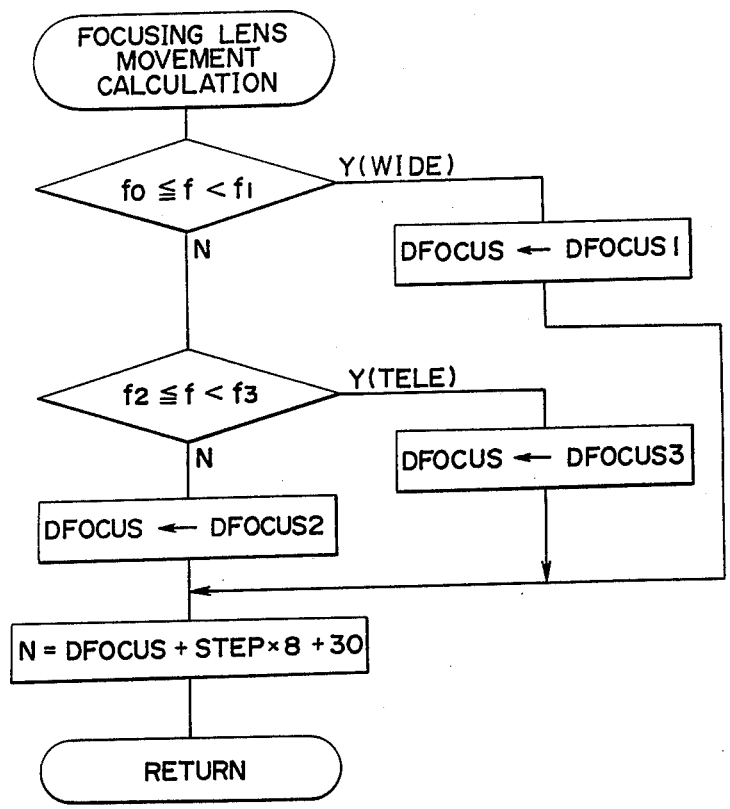
FIG. 17 is a flow chart for explaining part of the operations of a CPU shown in FIG. 13.

A flow of the focusing operations in the second embodiment is substantially the same as that in the first embodiment. Namely, it is similar to the flow of focusing operations shown in FIG. 8 and differs somewhat in a flow of calculating an amount of moving out a focusing lens. A flow of calculating an amount of moving out a focusing lens in the second embodiment is shown in FIG. 17.

First, when a focal length of a taking lens is in the relation $f0 \leq f < f1$, this represents the wide zone and an adjusting value DFOCUS 1 is substituted for a variable DFOCUS. When $f2 \leq f \leq f3$, this represents the telephoto zone and an adjusting value DFOCUS 3 is substituted for a variable DFOCUS. When $f1 \leq f < f2$, this represents the intermediate zone and an adjusting value DFOCUS2 is substituted for a variable DFOCUS. Then, an amount N of moving a focusing lens is determined based on the adjusting value DFOCUS and a detected range data STEP.

As such, since, in the apparatus of the second embodiment employing a zoom lens, a plurality of adjusting values corresponding to a plurality of focal lengths are stored, the apparatus has the advantages that an fc adjustment can be simply effected over the whole range of a zooming operation, in addition to the effects obtained in the first embodiment.

While, in the second embodiment, a variable scope of focal length is divided into three zones and adjusting values to respective three zones are determined and stored in the digital memory 18, it is noted that the number of divided zones will not be limited to three. The more the number of divided zones, the more accurate the focusing operation.

Now, a third embodiment of the present invention will be described hereinafter. The first embodiment is to correct an fc error by adjusting an amount of driving the focusing lens on the basis of an adjusting value stored in the digital memory 18. In this case, it should be premised that there exists an accurate correspondence between outputs of the range finder 12 and actual ranges to an object being photographed. Namely, the correspondence as shown in Table 1 should hold between both values. In practice, however, the assembled conditions of the range finder do not hold an accurate correspondence as shown in Table 1 because of variations in workmanship and the like of structural members of the range finder 12. When a focusing operation is effected in such condition, an error in an amount of driving a focusing lens is caused, resulting in an out-of-focus condition, because a range to an object being photographed is correctly recognized granting that there is no fc error. An error in an amount of driving a focusing lens in this case is called an AF error. In the third embodiment to be detailed below, an AF error is to be simultaneously corrected in addition to an fc error with one adjusting value.

A structure of the third embodiment is similar to that of the first embodiment and its drawing will be omitted. A difference is a resolving-power of the AFIC17. In the first embodiment, as shown in Table 1, a scope of photographable ranges between 0.85 m to infinity is divided into fifteen STEPs and each STEP corresponds to an amount of driving a lens for eight pulses which are produced in the encoder 23. In the third embodiment, a scope of photographable range between 0.85 m to infinity is divided into 120 STEPs. Accordingly, each STEP corresponds to an amount of driving a lens for one pulse from an encoder. Therefore, an amount of moving out a focusing lens is calculated in a flow of the focusing operations (see FIG. 8) with the following equation.

$$N = DFOCUS + STEP + 30$$

A structure of an adjusting apparatus for determining an adjusting value DFOCUS slightly differs from that of the first embodiment.

Figure 18:
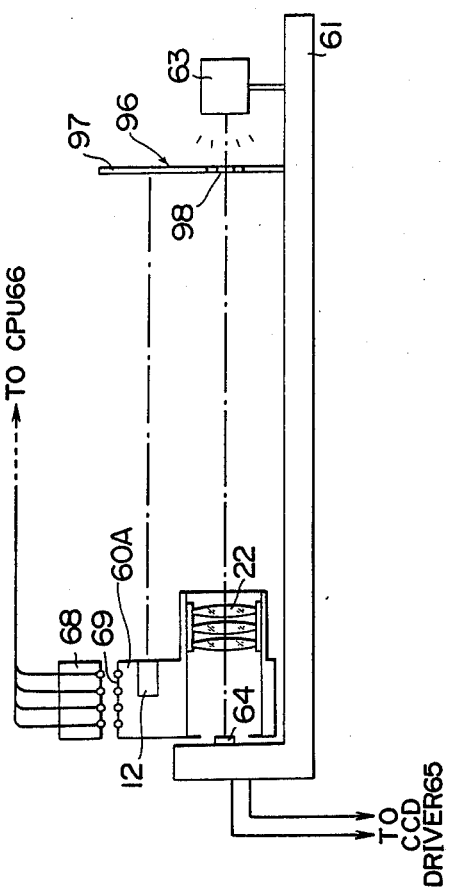
FIG. 18 is a schematic diagram of an adjusting apparatus which is used in a third embodiment of a focusing lens drive apparatus according to the present invention.

Distinctions will be described with reference to FIG. 18. An object plate 96 fixed on an adjusting stand 61 is integrally provided with a reflecting plate 97 on the upper part of a screen 98 having a striped perforation pattern for projecting an image onto a CCD line sensor 64. The reflecting plate 97 is opposite to a range finder 12 of the camera 60A. The opposite surface is formed with a uniform reflection factor. Other elements in the structure are quite the same as those in the first embodiment.

A flow of adjusting operations slightly differs from that of the first embodiment. In the first embodiment, a position where contrast of an image of the screen 62 reaches its peak as the focusing lens is moved little by little, is determined and a difference between the determined peak position and a peak position in design is an adjusting value to be corrected as an fc error. In the third embodiment, in addition to the above, a range to the reflecting plate 97 is determined by the range finder 12 and a difference of the determined range data from a value in design is determined as an AF error. Thus, an adjusting value for correcting both of the fc and AF errors is determined and stored in the EEPROM 51 of the digital memory 18.

Figure 19:
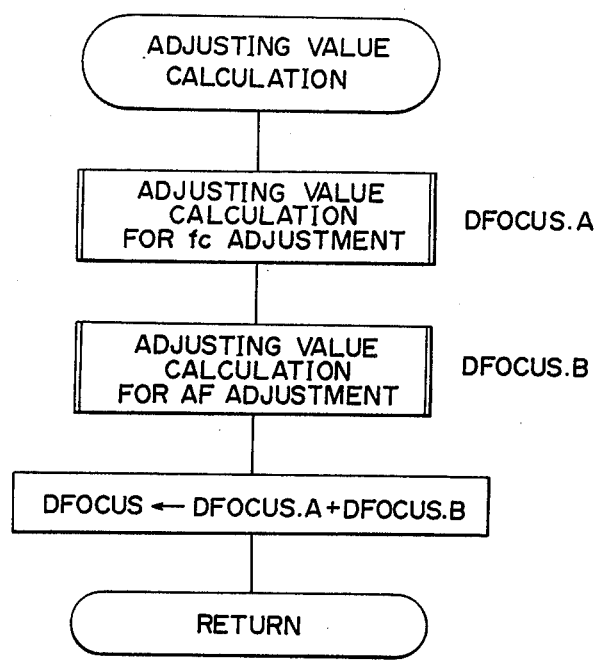
FIG. 19 is a flow chart of calculating an adjusting value in the third embodiment.

Only distinctions of the third embodiment over the first embodiment in a flow of adjusting operations will be described below. A flow of routine <CALCULATION OF ADJUSTING VALUE> in the flow of program <ADJUSTMENT> shown in FIG. 12 differs from that of the third embodiment. A flow in the third embodiment will be described with reference to FIG. 19. First, an adjusting value for an fc adjustment is calculated to make it a value DFOCUS·A. This is effected by the same procedures as that of the first embodiment.

Figure 20:
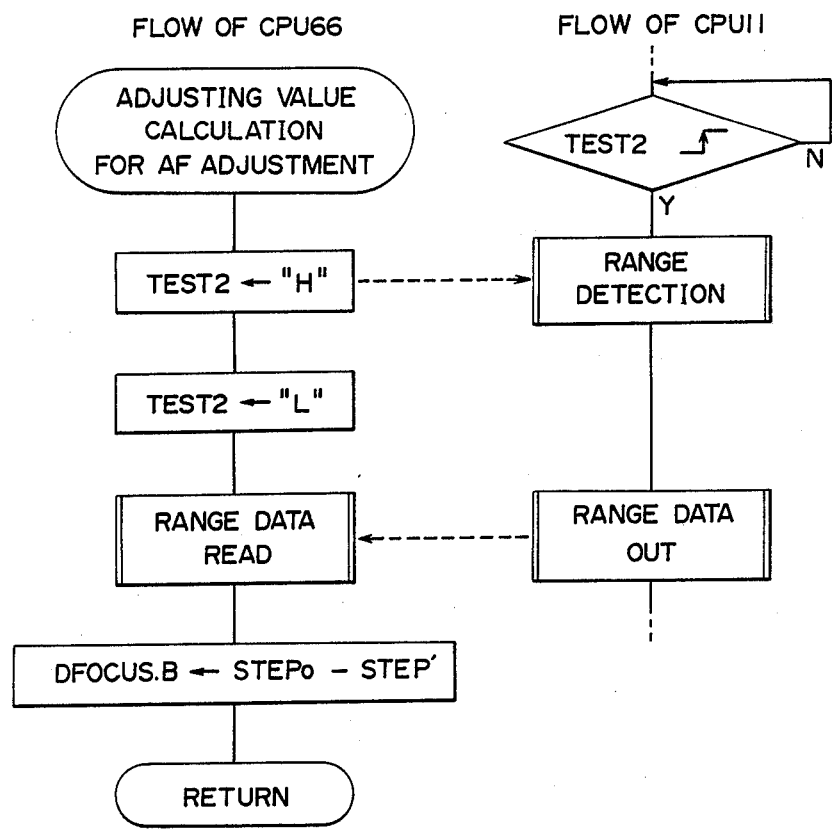
FIG. 20 is a flow chart for explaining flow operations of part of a CPU for use in adjustment and a CPU within a camera in the third embodiment.

Next, an adjusting value for an AF error is calculated. This flow will be described with reference to FIG. 20. First, a signal TEST 2 delivered from an output terminal T3 of the adjusting CPU66 is set to "L" immediately after being set to "H". The CPU11 within a camera detects the rise of the signal to measure a range. Upon the completion of range detection, the camera CPU 11 delivers the detected range data to the adjusting CPU 66. The adjusting CPU 66 reads in the range data to make it STEP'. Assuming that a detected range data is a value $STEP_O$ when an AF error is correctly adjusted, a difference between ASTEP' is an AF error. Accordingly, an adjusting value DFOCUS·B for adjusting an AF error is expressed as follows.

$$DFOCUS \cdot B = STEP_O - STEP'$$

Returning to FIG. 19, after the calculation of an adjusting value DFOCUS·B for adjusting an AF error is completed, a total adjusting value DEFOCUS is determined by adding the adjusting value DFOCUS·B to the adjusting value DFOCUS·A. Operations of the subsequent flow <ADJUSTMENT> are the same as those of the first embodiment.

As described above, in addition to the effects of the first embodiment, the third embodiment makes it possible to adjust an AF error which is caused by mechanical variations in the range finder, in a manner similar to the fc adjustment and to moderate an accuracy requirement in mechanical adjustment. It will be understood that, in the adjusting apparatus shown in FIG. 18, the connector 68 may be replaced by the pin 118 on the stand 61 shown in FIG. 10B.

What is claimed is:

1. A focusing lens drive apparatus for focusing a taking lens of a camera which lens is capable of switching to one of a plurality of focal lengths, comprising:
    focal length information input means for inputting information on a focal length of the taking lens;
    range detection means for detecting a range to an object being photographed;
    a digital memory for storing a plurality of adjusting values for focusing operations in response to information of focal lengths;
    adjusting value selecting means for selecting a specific adjusting value from a plurality of adjusting values stored in said digital memory in response to said inputted information on a focal length;
    lens drive amount determining means for determining an amount of driving the focusing lens on the basis of data detected by said range detection means and the specific adjusting value selected by said adjusting value selecting means;
    a lens drive mechanism for driving the focusing lens; and
    a lens drive mechanism controller means for controlling said lens drive mechanism in accordance with an amount of driving the lens determined by said lens drive amount determining means.

2. A focusing lens drive apparatus comprising:
    a digital memory for storing a plurality of differences between designed values of a lens position for forming an ideally focused position and actually measured values while a taking lens is assembled in terms of an adjusting value with every focal length;
    range detection means for measuring a range to an object being photographed;
    detection means for detecting data on focal lengths of the taking lens;
    calculating means for calculating an amount of moving the taking lens on the basis of range data obtained from said range detection means and the focal length data; and
    drive controller means for driving the taking lens in accordance with the amount of moving the taking lens.

3. An apparatus for utilizing an adjusting value to compensate for a focusing error in a taking lens, comprising:
    drive means for driving a taking lens;

detection means for detecting a moving position of the taking lens;

an object provided at a specified distance from the taking lens;

an image sensor disposed at a position normally occupied by a film surface and on which said object is projected through the taking lens;

calculating means for calculating a difference between an output of said image sensor and a designed value;

memory means; and write means for storing said difference in said memory means.

4. An apparatus for storing an adjusting value according to claim 3 in which said calculating means determines a contrast value of an object being photographed which is projected on said image sensor and calculates a difference between a peak value of said contrast value and a designed value.

5. An adjusting apparatus for a focusing lens comprising:

a camera body including a taking lens, drive means for driving the taking lens and control means for controlling said drive means;

an adjusting stand fixed to said camera body and having an object provided at a predetermined position and an image sensor disposed at a position of a film plane surface, and on which said object is projected through the taking lens; and means for detecting a difference between an output of said image sensor and a designed value when the taking lens is assembled and storing the difference in memory means disposed within said camera body.

6. A camera with a taking lens including range detection means for measuring a range to an object being photographed, a digital memory for storing an adjusting value for a focusing operation which is determined by using light transmitted through said taking lens, lens drive amount determining means for determining an amount of driving said lens on the basis of range data obtained from said range detection means and an adjusting value stored in said digital memory, a lens drive mechanism for driving the focusing lens and lens drive mechanism control means for controlling said lens drive mechanism in accordance with an amount of driving a focusing lens which is determined by said lens drive amount determining means;

characterized in that said camera body is provided with signal contacts for transmitting signals between the camera body and an external adjusting apparatus for determining an adjusting value for the focusing operation;

said camera body having a back lid movable between a closed and open position, said signal contacts being exposed for connection to the external apparatus when said back lid is in its open position and being connected to the lid when the lid is in the closed position.

7. A camera according to claim 6 in which said signal contacts is shared between a data back and an external adjusting apparatus.

8. A camera according to claim 6 in which said back lid is provided with data receiving means and a second set of contacts coupled to said data receiving means, said second set of contacts being in engagement with said first set of contacts when said back lid is in its closed position.

9. A method for determining a focus correction (fc) for an adjustable focus lens in a camera, said lens being axially movable between first and second end positions, comprising the steps of:

(a) measuring the light reflected from a test image arranged a predetermined distance from the focal plane of the camera;

(b) moving the lens a predetermined incremental distance toward said second end position;

(c) measuring the light reflected from the test image;

(d) determining the difference between the last two measurements to develop a contrast value;

(e) repeating steps (a) through (d) until the lens has moved a predetermined distance in the direction toward said second end position;

(f) determining the peak contrast value;

(g) determining the difference between the value of the number of incremental steps between the starting point of the measurements and the peak contrast value against the peak position determined by design for the distance between the camera film surface and the test image, said difference being said fc value;

(h) storing the fc value in the camera memory for use in a focus correction operation.

10. The method of claim 9 wherein a first microprocessor which functions as a master microprocessor is located external to the camera and a second microprocessor is placed in said camera which functions as a slave microprocessor, said master microprocessor controlling the performance of steps (f) and (g) and the slave microprocessor controlling the performance of steps (a) through (f) and (h).

11. The method of claim 9 wherein said sensor comprises a CCD sensor and further comprises the steps of integrating the output of the CCD sensor and storing the integrated value for use in determining the contrast value.

12. The method of claim 9 wherein said camera also includes a range finder comprising the further steps of:

detecting the range of the camera from a test reflecting plate arranged a predetermined distance from the camera;

determining the difference between the detected range value and the actual distance value between the test plate and the camera;

storing the resulting AF value in said memory for subsequent use.

13. The method of claim 9 wherein step (d) further comprises the step of calculating the value $(x_i+1-x_i)$ to obtain a contrast value wherein $x_i$ is the light value obtained during step (a) and $x_i+1$ is the light value obtained during step (c).

14. A focusing lens drive apparatus comprising:

a digital memory for storing a plurality of differences between standard values of a lens position for forming an ideally focused position and actually measured values while a taking lens is assembled in terms of an adjusting value with every focal length;

range detection means for measuring a range to an object being photographed;

detection means for detecting data on focal lengths of the taking lens;

calculating means for calculating an amount of moving the taking lens on the basis of range data obtained from said range detection means and an adjusting value selected by the focal length data; and drive controller means for driving the taking lens in accordance with the amount of moving the taking lens.

15. A method for determining the focus correction (fc) for an adjustable lens in a camera also having a memory and a microprocessor (hereinafter slave) linked to a second microprocessor (hereinafter master) located external to said camera and having an initiate switch comprising the steps of:
  transferring a first signal from the master to the slave upon operation of said initiate switch;
  said slave enabling receipt of a second signal from said master responsive to said first signal;
  said master generating said second signal at a predetermined interval;
  said slave advancing said lens to move predetermined incremental distances responsive to the second signal;
  said master controlling the measuring of the light reflected from a test image arranged a predetermined distance from the focal plane of the camera after each advancement of the lens;
  determining the difference of each measured value from the next to obtain a contrast value;
  determining the peak contrast value after the lens has been incrementally advanced a predetermined number of times;
  comparing the measured peak with a predetermined design value to obtain an fc value; and
  transferring the fc value to said slave;
  said slave receiving the fc value and storing the fc value in memory for subsequent use.

16. A method for determining the corrections required to compensate for a focal length error in a camera having an adjustable lens movable between first and second end positions, a range finder, a microprocessor and a memory, comprising the steps of:
  (a) measuring the light reflected from a test image arranged a predetermined distance from the focal plane of the camera;
  (b) moving the lens a predetermined incremental distance from said first end position toward said second end position;
  (c) measuring the light reflected from the test image;
  (d) determining the difference between the last two measurements to develop a contrast value;
  (e) repeating steps (a) through (d) until the lens has moved a predetermined distance in the direction of the second end position;
  (f) determining the peak contrast value;
  (g) determining the difference between the value of the number of incremental steps between the starting point and the peak contrast value against the peak position determined by design for the distance between the camera film surface and the test image, said difference being the fc error value;
  (h) storing the fc error value in the camera memory for use in a focus correction operation;
  (i) detecting the range of the camera from a test reflecting plate arranged a predetermined distance from the camera;
  (j) determining the difference between the detected range value and the actual distance value between the test plate and the camera; and
  (k) storing the resulting AF value in said memory for subsequent use.

17. The method of claim 16 further comprising summing the fc and AF values obtained and storing said sum for obtaining a correction in focal length.

18. A method for determining focus correction values for a camera having an adjustable lens including a zoom capability for use in wide angle, intermediate range and telephoto photography and further incorporating a memory, comprising the steps of:
  (a) determining an fw value for correction when performing wide angle photography comprising the steps of:
  (b) measuring the light reflected from a test image arranged a predetermined distance from the focal plane of the camera when the normal lens is in the wide angle photography range;
  (c) moving the lens a predetermined axial distance a plurality of times;
  (d) measuring at each axial position the reflected light from a test image located a predetermined distance from the focal plane of the camera;
  (e) determining the contrast between adjacent measured values;
  (f) determining the peak contrast value;
  (g) comparing the peak value with a predetermined peak design value to obtain a difference value representing the wide angle correction value fw;
  (h) storing the value fw in memory;
  (i) moving the lens to the telephoto range and repeating steps (b) through (f) to obtain a correction value $f_T$
  (j) comparing the peak value obtained with a predetermined design peak value for the telephoto range to obtain a correction value $f_T$; and
  (k) storing the value $f_T$ in memory;
  (l) moving the lens to the intermediate photographing range and repeating steps (b) through (f);
  (m) comparing the peak value obtained with a predetermined design value for the intermediate range to obtain a correction value $f_S$; and
  (n) storing the value $f_S$ in memory.

* * * * *